US006974637B2

(12) United States Patent
Pfaendtner et al.

(10) Patent No.: US 6,974,637 B2
(45) Date of Patent: Dec. 13, 2005

(54) NI-BASE SUPERALLOY HAVING A THERMAL BARRIER COATING SYSTEM

(75) Inventors: Jeffrey Allan Pfaendtner, Blue Ash, OH (US); Deborah A. Schorr, Cincinnati, OH (US); Ramgopal Darolia, West Chester, OH (US); Joseph David Rigney, Milford, OH (US); Irene Spitsberg, Loveland, OH (US); William Scott Walston, Mason, OH (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/707,543

(22) Filed: Dec. 19, 2003

(65) Prior Publication Data

US 2005/0136283 A1 Jun. 23, 2005

(51) Int. Cl.7 ............................................... B32B 15/00
(52) U.S. Cl. ...................... 428/632; 428/652; 428/670; 428/680; 428/686
(58) Field of Search ................................ 428/632, 652, 428/670, 680, 686; 148/428; 420/444, 445, 420/446, 447, 448, 450, 456, 460

(56) References Cited

U.S. PATENT DOCUMENTS 5,482,789 A * 1/1996 O'Hara et al. .............. 428/652
6,066,405 A 5/2000 Schaeffer ..................... 428/547
6,190,471 B1 2/2001 Darolia et al. .............. 148/537
6,283,714 B1 9/2001 Rigney et al. .......... 416/241 R
6,306,524 B1 10/2001 Spitsberg et al. ........... 428/621
6,332,926 B1 12/2001 Pfaendtner et al. ......... 118/721
6,375,425 B1 4/2002 Lee et al. ...................... 416/97
6,461,107 B1 10/2002 Lee et al. ...................... 416/96
6,461,108 B1 10/2002 Lee et al. ...................... 416/96
6,528,118 B2 3/2003 Lee et al. .................... 427/258
6,599,568 B2 7/2003 Lee et al. .................... 427/230
6,607,611 B1 8/2003 Darolia ........................ 148/277
6,652,987 B2 * 11/2003 Allen et al. ................. 428/632

OTHER PUBLICATIONS

"The effect of grit blasting on the oxidation behavior of a platinum-modified nickel-aluminide coating"; Metallurgical and Materials Transactions a (Physical Metallurgy and Materials Science) Minerals, Metals & Mater. Soc. & ASM Int USA, vol. 32A, No. 6, Jun. 1, 2001, pp. 1467-1478, XP008036870; ISSN: 1073-5623.

* cited by examiner

*Primary Examiner*—Robert R. Koehler
(74) *Attorney, Agent, or Firm*—David L. Narciso; Gary M. Hartman; Domenica N. S. Hartman

(57) ABSTRACT

An article and TBC coating system thereon that in combination exhibit significantly improved spallation resistance. The article comprises a substrate formed of a metal alloy containing ruthenium and one or more refractory elements (e.g., tantalum, tungsten, molybdenum, rhenium, hafnium, etc.). The substrate is protected by a coating system comprising an aluminum-containing bond coat on the surface of the substrate and a ceramic coating bonded to the substrate by the bond coat. The bond coat, preferably an aluminide, is deposited so as to be substantially free of ruthenium, though ruthenium is present in the bond coat as a result of diffusion from the substrate into the bond coat.

13 Claims, 2 Drawing Sheets

NI-BASE SUPERALLOY HAVING A THERMAL BARRIER COATING SYSTEM

FEDERAL RESEARCH STATEMENT

This invention was made with Government support under Agreement No. F33615-98-C-2893 awarded by the U.S. Department of the Air Force. The Government has certain rights in the invention.

BACKGROUND OF INVENTION

1. Field of the Invention

The present invention generally relates to protective coating systems for components exposed to high temperatures, such as the hostile thermal environment of a gas turbine engine. More particularly, this invention relates to a combination of a superalloy substrate composition and coating system that exhibits improved spallation resistance of the coating system.

2. Description of the Related Art

Environmental coatings and TBC bond coats are often formed of an oxidation-resistant aluminum-containing alloy or intermetallic. An example of the former is MCrAlX (where M is iron, cobalt and/or nickel, and X is yttrium or another rare earth element), which is deposited as an overlay coating. An example of the latter includes diffusion coatings, particularly diffusion aluminides and platinum-aluminides (PtAl) that contain aluminum intermetallics (e.g., NiAl and PtAl). Other types of environmental coatings and bond coats that have been proposed include beta-phase nickel aluminide (NiAl) overlay coatings. In contrast to the aforementioned MCrAlX overlay coatings, which are metallic solid solutions containing intermetallic phases, the NiAl beta phase is an intermetallic compound that exists for nickel-aluminum compositions containing about 30 to about 60 atomic percent aluminum. Notable examples of beta-phase NiAl coating materials are disclosed in commonly-assigned U.S. Pat. No. 5,975,852 to Nagaraj et al., U.S. Pat. No. 6,153,313 to Rigney et al., U.S. Pat. No. 6,255,001 to Darolia, and U.S. Pat. No. 6,291,084 to Darolia et al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. These same compositions can also be used alone as environmental coatings for superalloy components that do not require the thermal protection of a TBC.

Environmental coatings and TBC bond coats are often formed of an oxidation-resistant aluminum-containing alloy or intermetallic. An example of the former is MCrAlX (where M is iron, cobalt and/or nickel, and X is yttrium or another rare earth element), which is deposited as an overlay coating. An example of the latter includes diffusion coatings, particular diffusion aluminides and platinum-aluminides (PtAl) that contain aluminum intermetallics (e.g., NiAl and PtAl). Other types of environmental coatings and bond coats that have been proposed include beta-phase nickel aluminide (NiAl) overlay coatings. In contrast to the aforementioned MCrAlX overlay coatings, which are metallic solid solutions containing intermetallic phases, the NiAl beta phase is an intermetallic compound that exists for nickel-aluminum compositions containing about 30 to about 60 atomic percent aluminum. Notable examples of beta-phase NiAl coating materials are disclosed in commonly-assigned U.S. Pat. No. 5,975,852 to Nagaraj et al., U.S. Pat. No. 6,153,313 to Rigney et al., U.S. Pat. No. 6,255,001 to Darolia, and U.S. Pat. No. 6,291,084 to Darolia et al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. These same compositions can also be used alone as environmental coatings for superalloy components that do not require the thermal protection of a TBC.

TBC systems and environmental coatings are being used in an increasing number of turbine applications (e.g., combustors, augmentors, turbine blades, turbine vanes, etc.). The material systems used for most turbine airfoil applications comprise a nickel-base superalloy as the substrate material, a diffusion platinum aluminide (PtAl) as the bond coat, and a zirconia-based ceramic as the thermally-insulating TBC material. Notable substrate materials include directionally-solidified (DS) alloys such as René 142 and single-crystal (SX) alloys such as René N5. A notable example of a PtAl bond coat composition is disclosed in U.S. Pat. No. 6,066,405 to Schaeffer. Finally, a preferred TBC material is yttria-stabilized zirconia (YSZ), with a suitable composition being about 3 to about 20 weight percent yttria. Improved spallation resistance can be achieved by depositing the TBC by electron-beam physical vapor deposition (EB-PVD) to have a columnar grain structure.

Approaches proposed for further improving the spallation resistance of TBC's are complicated in part by the compositions of the underlying superalloy and interdiffusion that occurs between the superalloy and the bond coat. For example, the above-noted bond coat materials contain relatively high amounts of aluminum relative to the superalloys they protect, while superalloys contain various elements that are not present or are present in relatively small amounts in these coatings. During bond coat deposition, a primary diffusion zone of chemical mixing occurs to some degree between the coating and the superalloy substrate as a result of the concentration gradients of the constituents. At elevated temperatures, further interdiffusion occurs as a result of solid-state diffusion across the substrate/coating interface. The migration of elements across this interface alters the chemical composition and microstructure of both the bond coat and the substrate in the vicinity of the interface, generally with deleterious results. For example, migration of aluminum out of the bond coat reduces its oxidation resistance, while the accumulation of aluminum in the substrate beneath the bond coat can result in the formation of topologically close-packed (TCP) phases that, if present at sufficiently high levels, can drastically reduce the load-carrying capability of the alloy.

Certain high strength superalloys contain significant amounts of refractory elements, such as rhenium, tungsten, tantalum, hafnium, molybdenum, niobium, and zirconium. If present in sufficient amounts or combinations, these elements can reduce the intrinsic oxidation resistance of a superalloy and, following deposition of a diffusion aluminide coating, promote the formation of a secondary reaction zone (SRZ) that contains deleterious TCP phases. A notable example of such a superalloy is commercially known as MX4, a fourth generation single-crystal superalloy disclosed in commonly-assigned U.S. Pat. No. 5,482,789. There has been an ongoing effort to develop coating systems that substantially reduce or eliminate the formation of SRZ in high-refractory alloys coated with diffusion aluminide and overlay coatings. For example, ruthenium-containing diffusion barrier layers are disclosed in commonly-assigned U.S. Pat. No. 6,306,524 to Spitsberg et al. and commonly-assigned and copending U.S. patent application Ser. Nos. 09/681,821, 09/683,700, and 10/605,860 to Zhao et al.

In addition to issues attributable to the superalloy composition, all TBC systems exhibit a temperature-thermal-cycle-time capability that limits the useful life of the TBC system. More particularly, all TBC coating systems are limited by the occurrence of oxide spallation, which results in the loss of a portion of TBC followed by thermal degradation of the bond coat and environmental and thermal degradation of the underlying substrate. Coating system performance has been determined to be dependent on a number of factors, including stresses arising from the growth of a thermally-grown oxide (TGO) that develops at the interface between the TBC and bond coat, stresses due to the thermal expansion mismatch between the ceramic TBC and the metallic bond coat, the fracture resistance of the TGO interface (affected by segregation of impurities, roughness, oxide type and others), and time-dependent and time-independent plastic deformation of the bond coat that leads to rumpling of the bond coat/TGO interface. Therefore, advancements in TBC coating system are concerned with delaying the first instance of oxide spallation, affected by the above factors.

SUMMARY OF INVENTION

The present invention provides an article and TBC coating system thereon that in combination exhibit significantly improved spallation resistance. Surprisingly, improved spallation resistance can be achieved with bond coats applied to certain substrate materials that are known to exhibit relatively poor intrinsic oxidation resistance as a result of their high refractory element content.

More particularly, the article comprises a substrate formed of a metal alloy containing ruthenium, i.e., more than 0.0 weight percent and above any amount that might be unintentionally present as an impurity, and optionally one or more refractory elements (e.g., tantalum, tungsten, molybdenum, and/or rhenium). The substrate is protected by a coating system comprising an aluminum-containing bond coat on the surface of the substrate and a ceramic coating bonded to the substrate by the bond coat. The bond coat is deposited so as to be substantially free of ruthenium, which is nonetheless present in the bond coat as a result of diffusion from the substrate into the bond coat in view of the absence of a diffusion barrier between the substrate and bond coat. As a result of the permitted diffusion mechanism, the bond coat initially has a higher ruthenium content adjacent the substrate than adjacent the ceramic coating.

A significant and unexpected advantage of this invention is that, though the superalloy substrate may have a high refractory element content, spallation resistance of the ceramic coating (TBC) on the substrate is somehow improved by the ruthenium content of the substrate. For example, the present invention has been demonstrated with diffusion PtAl bond coats and beta-phase NiAl overlay bond coats deposited on the MX4 alloy, whose tantalum, tungsten, molybdenum, and rhenium contents are similar to or slightly higher than other high-refractory superalloys, but which further contains about 0.4 to about 6.5 wt. % ruthenium. Notably, the spallation resistance exhibited with the MX4 superalloy was unexpected in view of its poor intrinsic oxidation resistance. Furthermore, the level of TBC spallation resistance exhibited with MX4 was not observed with other high-refractory superalloys that do not contain ruthenium.

Other objects and advantages of this invention will be better appreciated from the following detailed description.

DETAILED DESCRIPTION

Figure 1:
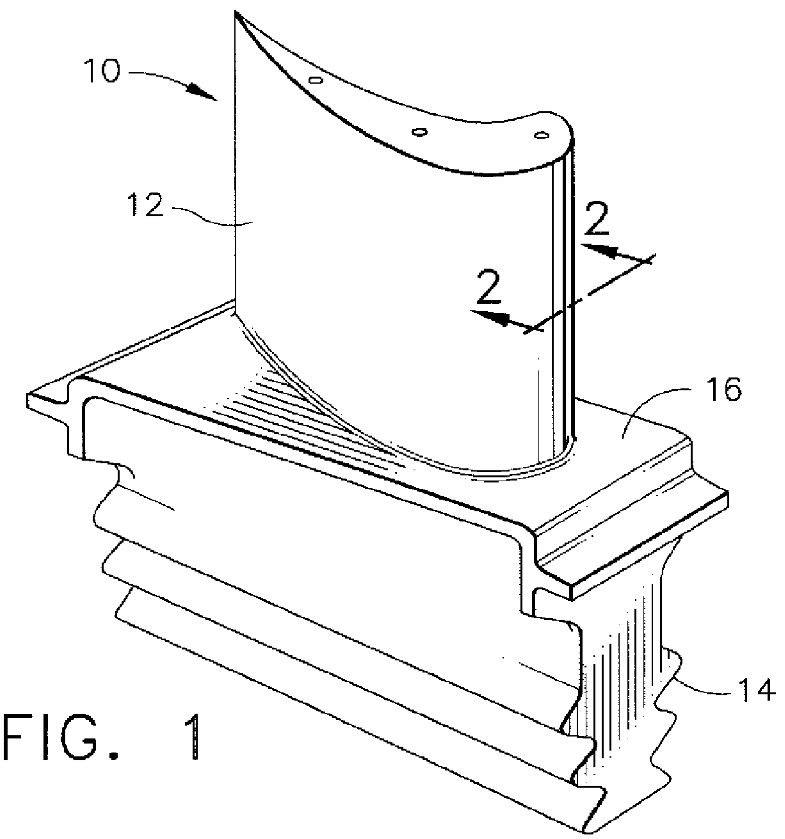
FIG. 1 is a perspective view of a high pressure turbine blade.

The present invention is generally applicable to components that employ a thermal barrier coating (TBC) system for protection from their operating environment. Notable examples of such components include the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. While the advantages of this invention will be described with reference to components of a gas turbine engine, such as the high pressure turbine blade 10 shown in FIG. 1, the teachings of this invention are generally applicable to other components that benefit from a TBC system.

Figure 2:
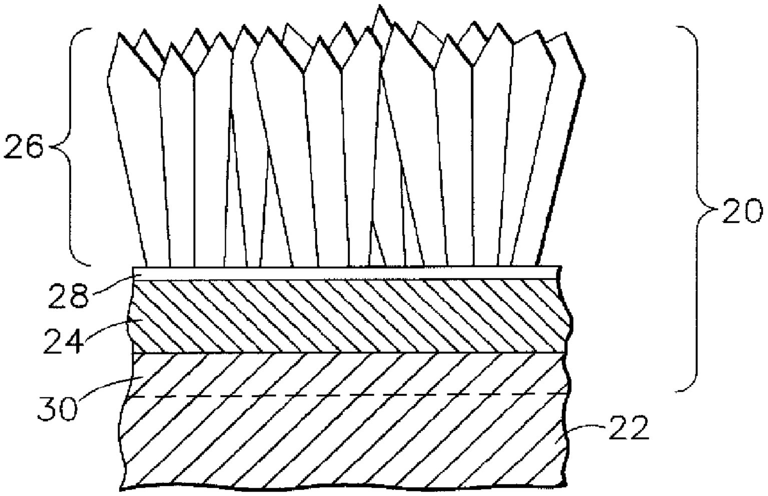
FIG. 2 is a cross-sectional representation of a TBC system on a surface region of the blade of FIG. 1 in accordance with an embodiment of this invention.

Represented in FIG. 2 is a surface region of the blade 10 that is protected by a TBC system 20 in accordance with an embodiment of the present invention. As shown, the TBC system 20 includes a bond coat 24 overlying a superalloy substrate 22, which is typically the base material of the blade 10. The bond coat 24 is shown as adhering a thermal-insulating ceramic layer 26, or TBC, to the substrate 22. As will be discussed in greater detail below, the bond coat 24 is an aluminum-containing composition, and consequently is depicted in FIG. 2 as having a thermally grown oxide (TGO) 28, generally aluminum oxide (alumina), that promotes adhesion of the TBC 26 to the bond coat 24. As shown, the TBC 26 has a strain-tolerant columnar grain structure obtained by depositing the TBC 26 using a physical vapor deposition (PVD) technique known in the art (e.g., EB-PVD), though a plasma spray technique could be used to deposit a noncolumnar ceramic layer. A preferred material for the TBC 26 is an yttria-stabilized zirconia (YSZ), a preferred composition being about 6 to about 8 weight percent yttria, optionally with up to about 20 weight percent of an oxide of a lanthanide-series element to reduce thermal conductivity. Other ceramic materials could be used for the TBC 26, such as yttria, nonstabilized zirconia, or zirconia stabilized by magnesia, ceria, scandia, and/or other oxides. The TBC 26 is deposited to a thickness that is sufficient to provide the required thermal protection for the underlying substrate 22 and blade 10, generally on the order of about 75 to about 300 micrometers.

A feature of the present invention is the ability to achieve greater spallation resistance for the TBC 26 through a combination of an aluminide bond coat 24 and a ruthenium-containing metal alloy substrate 22. It is believed that the diffusion of ruthenium from such an alloy has a potent solid-solution strengthening effect on an aluminide coating when introduced into the coating by diffusion during high-temperature exposure or service. The result of this interdiffusion is an increase in the spallation resistance of the TBC 26 deposited on the aluminide bond coat 24, apparently as a result of increased yield or creep strength of the bond coat 24 that reduces the amount of bond coat rumpling that occurs.

Reduced levels of rumpling and greater TBC spallation lives have been demonstrated for TBC deposited on PtAl diffusion aluminide and beta-phase NiAl overlay bond coats applied to substrates formed of the high-refractory nickel-based superalloy commercially known as MX4, which has a minimum ruthenium content of about 0.4 weight percent. It is believed that other suitable materials for use in this invention include other alloys that contain an appreciable amount of ruthenium, i.e., above any amount that might be unintentionally present as an impurity. On the basis of results obtained with the MX4 alloy, the benefits of the present invention are believed to be especially evident for single-crystal nickel-based superalloys that contain at least 0.4 weight percent ruthenium and at least one additional refractory metal, e.g., about 6.5 weight percent or more of tantalum, about 5 weight percent or more of tungsten, about 2 weight percent or more of molybdenum, about 3 weight percent or more of rhenium, about 0.1 weight percent or more of hafnium, etc. As disclosed in U.S. Pat. No. 5,482,789, the MX4 superalloy may contain, by weight, about 0.4% to about 6.5% ruthenium, about 5.8% to about 10.7% tantalum, about 3.0% to about 7.5% tungsten, about 0.9% to about 2.0% molybdenum, about 4.5% to about 5.75% rhenium, up to about 0.15% hafnium, about 4.25% to about 17.0% cobalt, about 1.25% to about 6.0% chromium, about 5.0% to about 6.6% aluminum, up to about 0.06% carbon, up to about 0.01% boron, up to about 0.02% yttrium, up to about 1.0% niobium, up to about 1.0% titanium, a molybdenum+chromium+niobium content of about 2.15% to about 9.0%, an aluminum+titanium+tungsten of about 8.0% to about 15.1%, and the balance nickel and incidental impurities. Other notable examples of high-refractory superalloys that may include ruthenium as an optional constituent are single-crystal superalloys commercially known under the names René 162 (U.S. Pat. No. 5,151,249) and René N6 (U.S. Pat. Nos. 5,270,123 and 5,455,120). However, commercially used compositions of these alloys do not contain ruthenium, and therefore the benefits attributed by this invention to the diffusion of ruthenium into an aluminide coating on these alloys were not previously obtained.

As noted above, the bond coat 24 employed by this invention is preferably a diffusion aluminide or beta-phase NiAl intermetallic overlay coating. A preferred diffusion aluminide bond coat is a platinum aluminide (containing nickel aluminide and platinum aluminide intermetallics) disclosed in U.S. Pat. No. 6,066,405 to Schaeffer, and can be deposited by such known aluminizing processes as pack cementation, vapor phase deposition (VPA), and chemical vapor deposition (CVD) techniques. Suitable beta-phase NiAl intermetallic overlay coatings are disclosed in U.S. Pat. Nos. 6,153,313, 6,255,001, and 6,291,084, with preferred coatings containing, in atomic percent, about 30% to about 60% aluminum, optionally up to about 10% chromium, about 0.1% to about 1.2% of a reactive element such as zirconium and/or hafnium, optional additions of silicon and/or titanium, the balance essentially nickel. A beta-phase NiAl overlay bond coat 24 can be deposited by various physical vapor deposition processes, including EB-PVD, cathodic arc physical vapor deposition, ion plasma deposition (IPD), and thermal spray.

FIG. 2 represents a diffusion zone 30 as being present beneath the bond coat 24. The depth and composition of the diffusion zone 30 will depend on the coating type, deposition technique used to deposit the bond coat 24, and thermal history of the blade 10. The diffusion zone 30 contains various intermetallic and metastable phases that form as a result of diffusional gradients and changes in elemental solubility in the local region of the substrate 22. Over time at elevated temperatures, the diffusion zone 30 grows and, if the refractory content of the substrate 22 is sufficiently high (e.g., MX4, René 162 and N6), form the aforementioned SRZ containing detrimental TCP phases. Because these deleterious phases reduce rupture strength, ductility and fatigue resistance of the substrate alloy, previous efforts have been directed to developing diffusion barriers between high-refractory superalloy substrates (e.g., MX4, René 162 and N6) and aluminum-containing coatings, such as the substrate 22 and aluminide bond coat 24 depicted in FIG. 2.

In an investigation leading to the present invention, substantially identical commercial PtAl diffusion coatings were applied to one-inch (about 25 mm) diameter button coupons of two different single-crystal substrate materials: René N5 and the MX4. The N5 alloy (U.S. Pat. No. 6,074,602) is a ruthenium-free alloy having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities. The PtAl coatings were nominally 0.0020 to 0.0025 inch (about 0.051 to 0.064 mm) in thickness. A 5 mil (about 125 micrometer) topcoat of zirconia stabilized by about 7 weight percent yttria (7% YSZ) was deposited by EB-PVD as a TBC on the PtAl coatings. These samples underwent a furnace cycle test (FCT) in which the temperature was cycled between about 400° F. (about 200° C.) and about 2125° F. (about 1160° C.), with an approximate 45-minute hold at the elevated temperature and 15 minutes for cooling to the lower temperature. Cycling continued for each button until about 20% of the TBC had spalled from the button.

Figure 3:
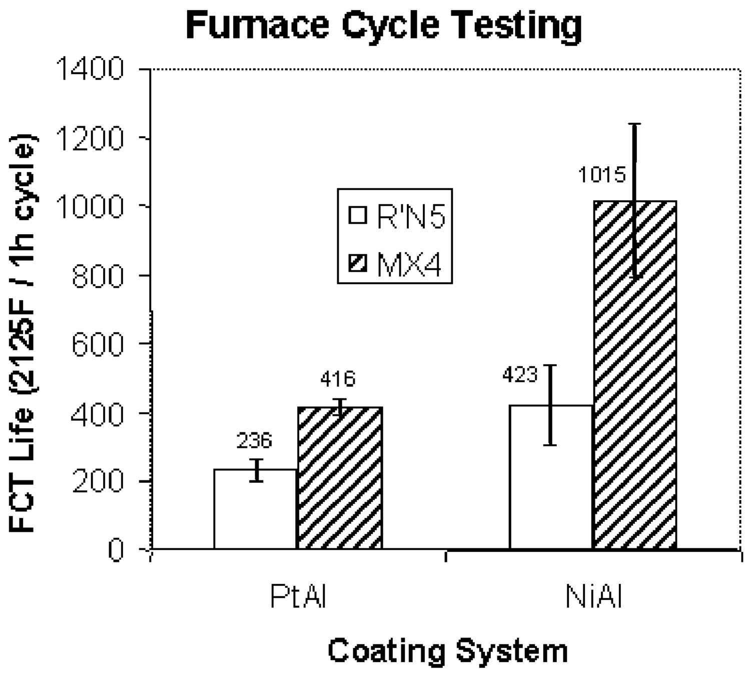
FIG. 3 is a chart evidencing differences in TBC spallation resistance between TBC systems deposited on a ruthenium-free superalloy and a ruthenium-containing superalloy.
Figure 4:
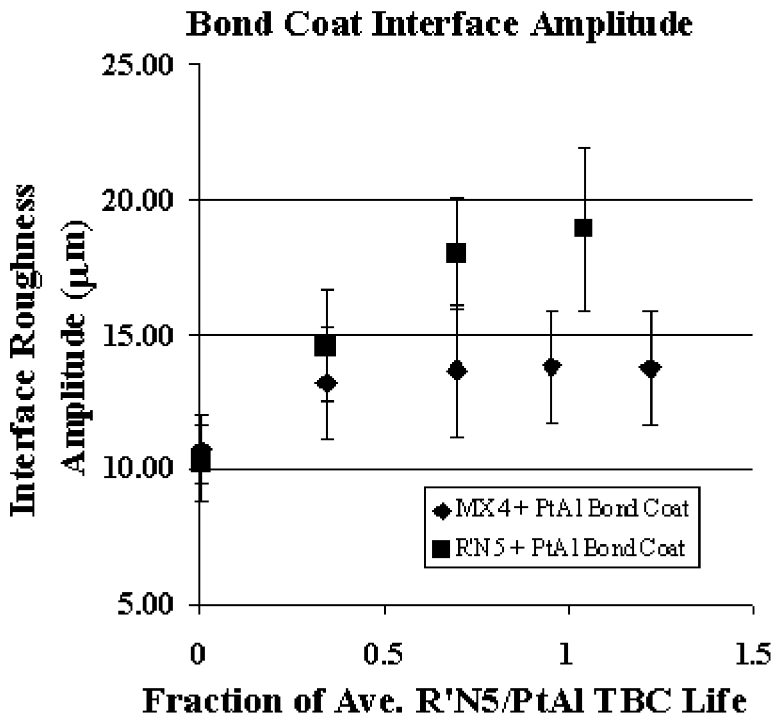
FIG. 4 is a graph evidencing a difference in bond coat rumpling between PtAl diffusion bond coats deposited on a ruthenium-free superalloy and a ruthenium-containing superalloy.

FIG. 3 is a chart showing that the MX4/PtAl specimens had an average FCT life of about 416 cycles, or about 1.75 times the 236-cycle life exhibited by the N5/PtAl specimens. An analysis of variance demonstrated that the two sample populations were different to greater than 95% confidence level. FIG. 4 is a graph that plots the amount of surface roughness, or rumpling, that ocurred in specimens taken from each of the two specimen groups. From FIG. 4, it can be seen that the PtAl/MX4 specimen incurred much less bond coat deformation than the PtAl/N5 specimen, which suggested that a beneficial strengthening effect occurred when a PtAl bond coat was deposited on an MX4 substrate.

In a second investigation, beta-phase NiAlCrZr overlay bond coats were applied by EB-PVD to additional N5 and MX-4 button specimens, which were then coated with 7% YSZ TBC such that, aside from the bond coats, the specimens were essentially identical to the specimens of the first investigation. The NiAl coatings were nominally about 0.0016 to 0.0020 (about 0.041 to about 0.051 mm) in thickness. All specimens underwent the same 2125° F. FCT test conducted in the first investigation. The results of this investigation are also represented in FIG. 3, which shows that the MX4/NiAl specimens had an average FCT life of about 1015 cycles, which was more than twice the 423-cycle life exhibited by the N5/NiAl specimens. An analysis of variance performed on the data demonstrated that the two sample populations were different to greater than 95% confidence level. Notably, this test also demonstrated the superiority of the NiAlCrZr bond coats over the PtAl diffusion bond coats in terms of TBC spallation resistance.

In a third investigation, beta-phase NiAlCrZr overlay bond coats were applied by EB-PVD to René N6 button specimens. The N6 alloy has a nominal composition, by weight, about 12.5% Co, 4.2% Cr, 7.2% Ta, 5.75% Al, 5.75% W, 5.4% Re, 1.4% Mo, 0.15% Hf, 0.05% C, 0.004% B, 0.01% Y, the balance nickel. The specimens were coated with 7% YSZ TBC such that, aside from the substrate material, the specimens were essentially identical to the specimens of the first and second investigations. These specimens then underwent the same 2125° F. FCT test carried out in the first and second investigations. The results of this test were that the N6/NiAlCrZr specimens had an average FCT life of about 479 cycles, which was only about 10% higher than the N5/NiAlCrZr specimens of the second investigation. An analysis of variance performed on the data demonstrated that the sample populations from the N6/NiAlCrZr specimens of this investigation and the MX4/NiAlCrZr specimens of the second investigation were different to greater than 95% confidence level. Accordingly, while the N6/NiAlCrZr specimens exhibited some improvement (about 10% higher) in FCT life over the N5/NiAlCrZr specimens, the MX4/NiAlCrZr specimens unexpectedly exhibited a far more pronounced improvement in FCT life (about 140% higher).

In that the MX4 and N6 alloys both contain relatively high levels of tantalum, tungsten, molybdenum, and rhenium, but differ by the presence of ruthenium in the MX4 alloy, it was theorized that the ruthenium content of MX4 was primarily responsible for the drastic improvement in the FCT lives of the TBC deposited on their aluminide bond coats. Such results were obtained even though MX4 is known to exhibit poorer intrinsic oxidation resistance than N6. However it was theorized that, during FCT cycling, sufficient ruthenium had diffused into the aluminide bond coats from the MX4 substrates, resulting in a ruthenium concentration gradient through the bond coats (higher adjacent the substrates) that had a beneficial effect on the spallation lives of the TBC"s deposited on the bond coats.

While the invention has been described in terms of particular embodiments, it is apparent that other forms could be adopted by one skilled in the art. Therefore, the scope of the invention is to be limited only by the following claims.

What is claimed is:

1. An article comprising:

a substrate formed of a metal alloy containing ruthenium above an amount that might be unintentionally present as an impurity; and a coating system on a surface of the substrate, the coating system comprising an aluminum-containing bond coat on the surface of the substrate and a ceramic coating bonded to the substrate by the bond coat, the bond coat being substantially free of ruthenium except for ruthenium that has diffused into the bond coat from the substrate;

wherein the bond coat comprises an overlay coating consisting essentially of intermetallic phases and contains, in atomic percent, about 30% to about 60% aluminum, optionally up to about 10% chromium, 0.1% to about 1.2% of at least one element chosen from the group consisting of zirconium, hafnium, silicon, and titanium, the balance being essentially nickel.

2. The article according to claim 1, wherein the ceramic coating comprises yttria-stabilized zirconia.

3. The article according to claim 1, wherein the ceramic coating has a columnar grain structure.

4. The article according to claim 1, wherein the metal alloy of the substrate is a superalloy containing at least 0.4 weight percent ruthenium.

5. The article according to claim 4, wherein the superalloy contains about 0.4 to about 6.5 weight percent ruthenium.

6. The article according to claim 5, wherein the superalloy consists of, by weight, 0.4% to 6.5% ruthenium, 4.5% to 5.75% rhenium, 5.8% to 10.7% tantalum, 4.25% to 17.0% cobalt, up to 0.15% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, and wherein the sum of molybdenum plus chromium plus niobium is 2.15% to 9.0%, and wherein the sum of aluminum plus titanium plus tungsten is 8.0% to 15.1%, the balance nickel and incidental impurities.

7. The article according to claim 4, wherein the superalloy contains at least one refractory metal selected from the group consisting of about 6.5 weight percent or more of tantalum, about 5 weight percent or more of tungsten, about 2 weight percent or more of molybdenum, about 3 weight percent or more of rhenium, and about 0.1 weight percent or more of hafnium.

8. A gas turbine engine component formed of a nickel-base superalloy and having a coating system on a surface thereof, the nickel-base superalloy containing at least 0.4 weight percent ruthenium and at least one refractory metal selected from the group consisting of tantalum, tungsten, molybdenum, rhenium and hafnium, the coating system comprising an aluminide bond coat on the surface of the substrate and a ceramic coating bonded to the component by the bond coat, the bond coat being substantially free of ruthenium except for ruthenium that has diffused into the bond coat from the superalloy so that the bond coat has a higher ruthenium content adjacent the component than adjacent the ceramic coating;

wherein the bond coat is an overlay coating consisting essentially of intermetallic phases and contains, in atomic percent, about 30% to about 60% aluminum, optionally up to about 10% chromium, 0.1% to about 1.2% of at least one element chosen from the group consisting of zirconium, hafnium, silicon, and titanium, the balance being essentially nickel.

9. The gas turbine engine component according to claim 8, wherein the ceramic coating comprises yttria-stabilized zirconia and has a columnar grain structure.

10. The gas turbine engine component according to claim 8, wherein the superalloy contains about 0.4 to about 6.5 weight percent ruthenium.

11. The gas turbine engine component according to claim 8, wherein the superalloy contains at least one refractory metal selected from the group consisting of about 6.5 weight percent or more of tantalum, about 5 weight percent or more of tungsten, about 2 weight percent or more of molybdenum, about 3 weight percent or more of rhenium, and about 0.1 weight percent or more of hafnium.

12. The gas turbine engine component according to claim 8, wherein the superalloy contains about 6.5 weight percent or more of tantalum, about 5 weight percent or more of tungsten, about 2 weight percent or more of molybdenum, about 3 weight percent or more of rhenium, and about 0.1 weight percent or more of hafnium.

13. The gas turbine engine component according to claim 8, wherein the superalloy consists of, by weight, 0.4% to 6.5% ruthenium, 4.5% to 5.75% rhenium, 5.8% to 10.7% tantalum, 4.25% to 17.0% cobalt, up to 0.15% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, and wherein the sum of molybdenum plus chromium plus niobium is 2.15% to 9.0%, and wherein the sum of aluminum plus titanium plus tungsten is 8.0% to 15.1%, the balance nickel and incidental impurities.

* * * * *